United States Patent
Miyagawa et al.

(10) Patent No.: US 6,726,191 B2
(45) Date of Patent: Apr. 27, 2004

(54) SPRING SHEET

(75) Inventors: Koichi Miyagawa, Tokyo (JP); Takashi Fujii, Tokyo (JP); Nobuo Momose, Tokyo (JP); Junji Ogura, Tokyo (JP); Masahiko Shimizu, Tokyo (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/352,878

(22) Filed: Jan. 29, 2003

(65) Prior Publication Data

US 2003/0111782 A1 Jun. 19, 2003

Related U.S. Application Data

(63) Continuation of application No. PCT/JP02/05111, filed on May 27, 2002.

(30) Foreign Application Priority Data

May 29, 2001 (JP) .......................................... 2001-160905
May 24, 2002 (JP) .......................................... 2002-150740

(51) Int. Cl.[7] ................. F16F 1/12; F16F 9/32
(52) U.S. Cl. .................. 267/170; 267/286; 267/166
(58) Field of Search ................... 267/170, 166, 267/286, 179, 180, 221; 280/124.179, 124.151, 124.155, 124.154, 124.147, 124.146

(56) References Cited

FOREIGN PATENT DOCUMENTS

JP            2001-26208 A            1/2001

OTHER PUBLICATIONS

Translation of JP 2001–26208.*

* cited by examiner

*Primary Examiner*—Douglas C. Butler
(74) *Attorney, Agent, or Firm*—Birch, Stewart, Kolasch & Birch, LLP (57) ABSTRACT

A lower spring sheet has receiving portions on a sheet surface that supports a coil spring. Thus the sheet surface and a spring end portion of the coil spring come into contact discretely. The contact positions between the coil spring and the sheet surface maintain unchanged, however a undulated portion the spring end portion may have due to the manufacturing tolerance is extended when the coil spring is compressed.

12 Claims, 7 Drawing Sheets

SPRING SHEET

CROSS-REFERENCE TO RELATED APPLICATIONS

This is a Continuation Application of PCT Application No. PCT/JP02/05111, filed May 27, 2002, which was not published under PCT Article 21(2) in English.

This application is based upon and claims the benefit of priority from the prior Japanese Patent Applications No. 2001-160905, filed May 29, 2001; and No. 2002-150740, filed May 24, 2002, the entire contents of both of which are incorporated herein by reference.

BACKGROUND OF THE INVENTION

1. Field of the Invention

The present invention relates to a spring sheet that supports a coil spring.

2. Description of the Related Art

Figure 15:
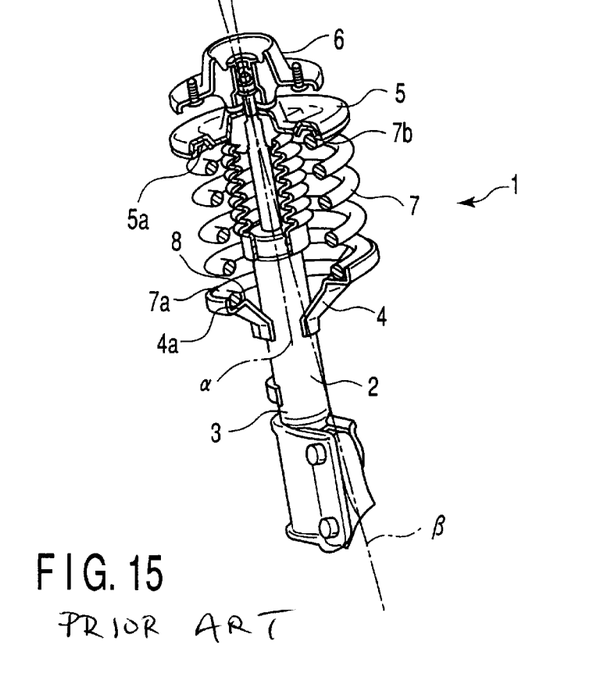
FIG. 15 is a perspective view of a suspension apparatus provided with a conventional spring sheet.

In many cases, a strut type suspension apparatus is used as the suspension apparatus for such a vehicle as a motor car. An example of the suspension apparatus 1 is shown in FIG. 15.

The suspension apparatus 1 comprises a damper 2 and a coil spring 7. The damper 2, which serves as a strut, extends through the region defined by the coil spring 7. The lower end of the coil spring 7 is supported on a lower spring sheet 4, while the upper end thereof is held down by an upper spring sheet 5. The lower spring sheet 4 is shaped like a funnel and is attached to the outer circumferential surface of the outer casing of the damper 2. The upper spring sheet 5 is shaped as a disk and is fixed to the upper end (i.e., the piston end) of the damper 2 together with an upper mount 6 assembled to a car body. A wheel is attached to the lower portion of the damper 2 by means of a hub carrier.

When the damper 2 contracts, the coil spring 7 is applied with a compressive load by the lower spring sheet 4 and the upper spring sheet 5. Sheet surfaces 4a and 5a of the lower spring sheet 4 and the upper spring sheet 5, which the coil spring 7 come into contact with, are formed in such a manner as to continuously extend in accordance with the shapes of spring end portions 7a and 7b of the coil spring 7. For example, where the spring end portions have no winding pitch amount (i.e., the case where the pitch amount is 0 mm/winding), the sheet surfaces are formed to be flat, as indicated by the thick line "f" in FIG. 16. Where the spring end portions have a winding pitch amount, the sheet surfaces are formed to extend spirally at an angle corresponding to the pitch amount of the spring end portions, as indicated by the thick line "s" in FIG. 17.

For easy assembly of the suspension apparatus 1 into the body of an automobile or the like, the spring sheets 4 and 5 usually support the coil spring 7 so that the central axis $\alpha$ of the coil spring 7 may be inclined with reference to an axis of actual load application, such as an actual application axis $\beta$ of an external force extending between a king pin and the upper end of the damper. In this condition, the damper 2 and the coil spring 7 jointly dampen a shock applied from the front wheels.

However, the pitch amount of the coil spring changes so that the compressed amount varies in accordance with a change in the compressive load. On the other hand, the sheet surfaces 4a and 5a are not deformed in accordance with a change in the pitch amount of the coil spring 7. As a result, the contact areas and contact positions between the spring end portions 7a, 7b and the sheet surfaces 4a, 5a may vary in accordance with changes in the compressive load, which serves to compress the coil spring 7.

Figure 16:
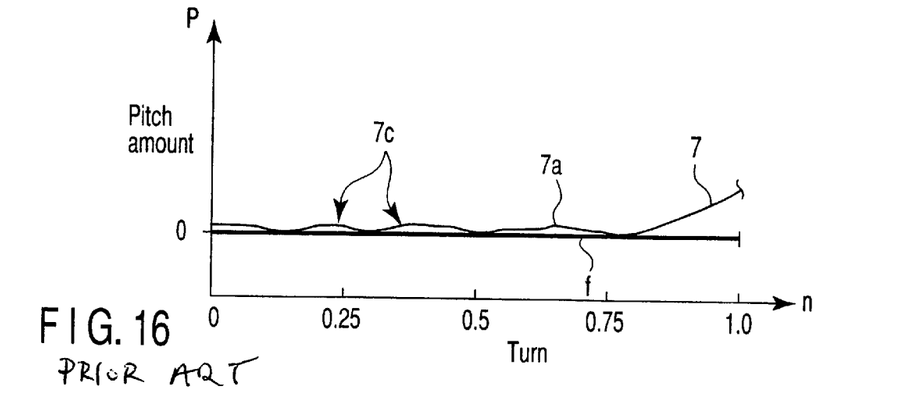
FIG. 16 shows how a spring sheet and a coil spring come into contact in the prior art in relation to the number of turns and the pitch amount of the coil spring.
Figure 17:
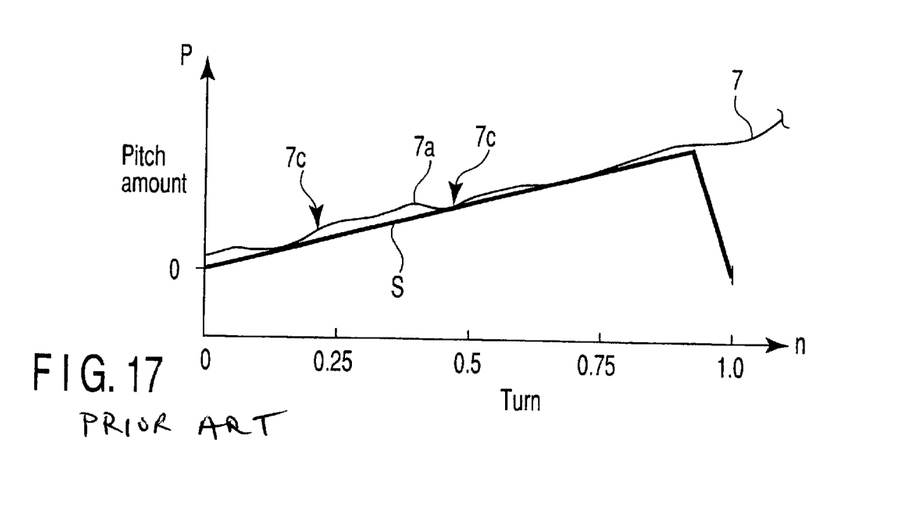
FIG. 17 shows how a spring sheet and a coil spring come into contact in the prior art in relation to the number of turns and the pitch amount of the coil spring.

In addition, the coil spring 7 inevitably undergoes variations arising from the manufacturing tolerance. In FIGS. 16 and 17, such variations are represented by undulated portions 7c which indicate a phenomenon wherein the coil wire is shifted from its right position in the direction of the central axis $\alpha$ of the coil spring 7 at the spring end portion 7a, and a pitch tolerance between the spring end portion 7a and the sheet surface 4a.

Where the undulated portions 7c exist, they extend along the sheet surfaces 4a and 5a when the coil spring 7 is compressed. When the displaced portions 7c extend, the contact range (contact area) between the spring end portion 7a and the sheet surface 4a varies. Where the pitch tolerance exists, the contact position between the spring end portion 7a and the sheet surface 4a varies in the process of compressing the coil spring.

When the contact range and positions between the spring end portion 7a and the sheet surface 4a vary, the distribution of the contact reaction applied from the spring sheet 4 to the coil spring 7 is changed. When the distribution of the contact reaction changes, the load axis along which the resultant of loads is exerted on the coil spring 7 changes in direction, accordingly. The coil spring 7 of the suspension apparatus 1 shown, for example, in FIG. 15 is assembled in such a manner that the central axis $\alpha$ is shifted from the actual application axis $\beta$ in which a load is applied actually. Owing to this structure, a change in the direction of the load axis along which the load is exerted on the coil spring 7 affects the balance between the force component applied in the sliding direction of the damper 2 and the force component applied in the direction traversing the sliding direction. Since the force acting in the direction traversing the sliding direction serves as a bending moment with reference to the sliding direction of the damper 2, the sliding resistance of the damper 2 varies. As a result, the dynamic characteristics of the suspension apparatus 1 vary, failing to provide intended performance.

BRIEF SUMMARY OF THE INVENTION

A spring sheet according to the present invention is intended to control the direction of the load axis of the contact reaction applied to the spring end portion of a coil spring, independently of the compressed state of the coil spring.

To this end, the spring sheet according to the present invention is provided with a plurality of receiving portions on its sheet surface, and the receiving portions come into contact with the spring end portion of a coil spring in a discrete fashion.

At specific positions, the spring end portion is locally received by the receiving portions. With this structure, even if the displaced portion extends when the coil spring compresses, it does not undesirably touch the sheet surface. In addition, the coil spring does not contact the sheet surface at undesired portions even if the coil spring has characteristics deviating from design values.

The receiving portions of the spring sheet are located at positions which sandwich the central axis of the coil spring from both sides even when the coil spring is shifted from the central axis of the spring, and at axial positions which permit the load axis of the contact reaction distribution to align with the actual application axis of an external force when the coil spring comes into contact with a projection.

With this structure, even if the coil spring is assembled in such a manner as to be shifted from the actual application axis of an external force, the spring sheet allows the coil spring to generate a reaction force in the direction of the actual application axis, and prevent it from generating a lateral force, which would adversely affect movement along the actual application axis.

In the case of a spring sheet in which the receiving portion on one side is made up of a plurality of sections, the load axis of the coil spring is inclined to align with the actual application axis of an external force exerted on the coil spring.

In the case of a spring sheet can be separated into a spring receiving member on which a sheet surface is formed, and a bracket which supports the spring receiving member, the specifications of the spring sheet can be changed by replacing the spring receiving portion with another. That is, the spring sheet is applicable to suspensions of different specifications by selectively employing different spring receiving members.

In the case of a spring sheet that supports the spring end portion of a coil spring by means of a plurality of receiving portions arranged in the winding direction of the coil spring, the coil spring is supported on the plurality of receiving portions without being adversely affected by the manufacturing tolerances of the coil spring and the spring sheet. Therefore, the load axis of the coil spring can be easily orientated in a desired direction.

The receiving portions of the coil spring are arranged in such a manner that the load axis, which indicates the direction in which the resultant of forces acting between the receiving portions and the coil spring is applied, is made to align with the actual application axis along which a load is exerted on the coil spring.

The receiving portions are arranged along an imaginary plane passing the actual application axis and the central axis of the coil spring and located at positions sandwiching the central axis from both sides. The center of the force the coil spring receives from at least one of the receiving portions on each side is located along the imaginary plane.

Of the receiving portions, at least one receiving portion close to the actual application axis is shifted along the central axis in a direction in which the coil spring is compressed, as compared to at least one receiving portion located away from the actual application axis.

DETAILED DESCRIPTION OF THE INVENTION

A spring sheet of the first embodiment according to the present invention will now be described with reference to FIGS. 1 to 6, referring to the case where the present invention is applied to a strut type suspension apparatus 1, such as that shown in FIG. 15.

Figure 1:
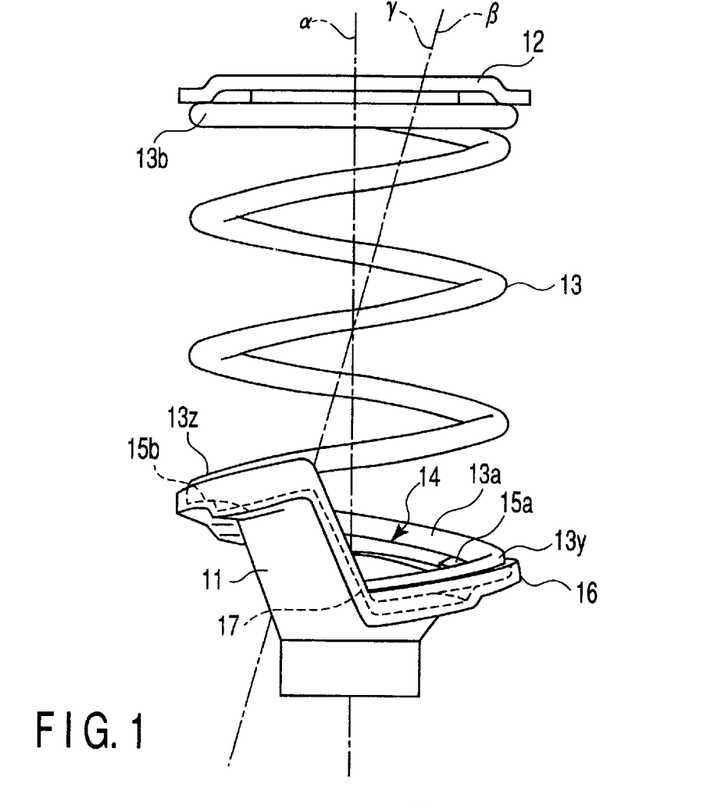
FIG. 1 is a front view of a lower spring sheet according to the first embodiment of the present invention, the lower spring sheet being depicted together with a coil spring and an upper spring sheet.

FIG. 1 shows a lower spring sheet 11, an upper spring sheet 12 and a coil spring 13, which are structural elements of the suspension apparatus. The lower spring sheet 11 is provided with a sheet surface 14 on which the spring end portion 13a of the coil spring 13 is supported. The sheet surface 14 is formed to be spiral in accordance with the winding pitch amount of the spring end portion 13a. The sheet surface 14 has a plurality of receiving portions arranged in the winding direction of the coil spring 13. In the present embodiment, two receiving portions 15a, 15b projected toward the coil spring 13 are provided. With this structure, the sheet surface 14 comes into discrete contact with the spring end portion 13a of the coil spring 13.

A wall 16 is formed along the outer circumference of the sheet surface 14 to prevent the coil spring 13 from moving in the radial direction. The movement of the coil spring 13 in the rotating direction (to be is precise, in the spiral direction) is stopped when the wire end 13x of the coil spring 13 hits against a stopper 17.

The spring end portion 13b of the coil spring 13, which is opposite to the spring end portion that comes into contact with the lower spring sheet 11, is in contact with the upper spring sheet 12. The central axis a of the coil spring 13 is inclined with reference to the actual application axis β along which an external force is exerted on the coil spring 13.

Figure 2:
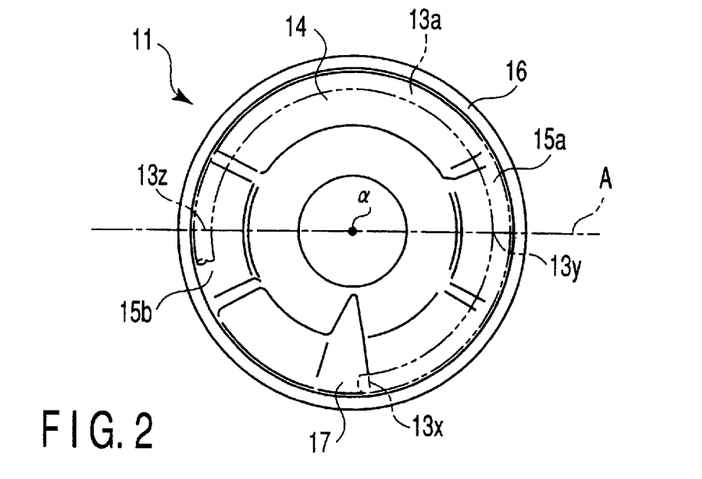
FIG. 2 is an upper surface view of the lower spring sheet depicted in FIG. 1.
Figure 3:
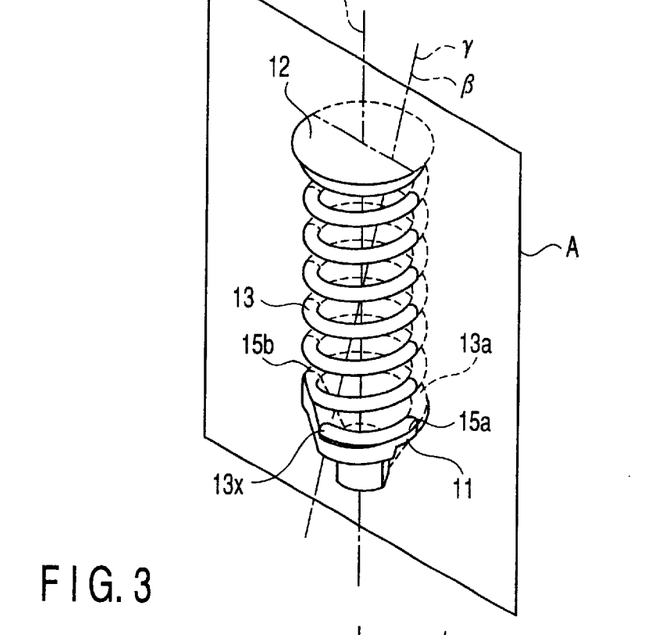
FIG. 3 is a perspective view illustrating how the positional relations among a spring center axis, an actual application axis and a load axis are in the lower spring sheet depicted in FIG. 1.
Figure 4:
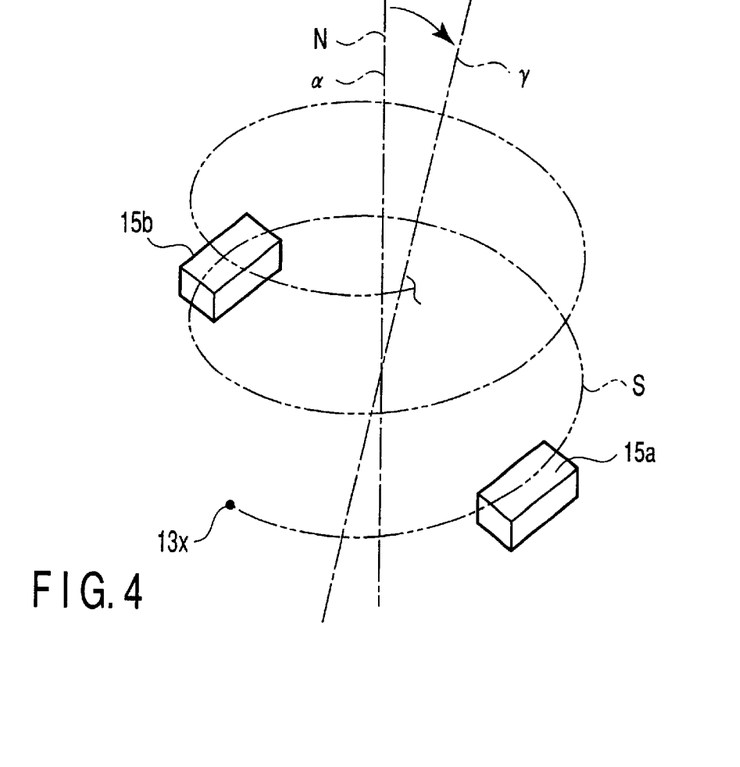
FIG. 4 is a schematic diagram illustrating the positional relations between a receiving portion of the lower spring sheet and the spring end portion of the spring coil in FIG. 1 and further illustrating the inclination direction of the load axis.
Figure 5:
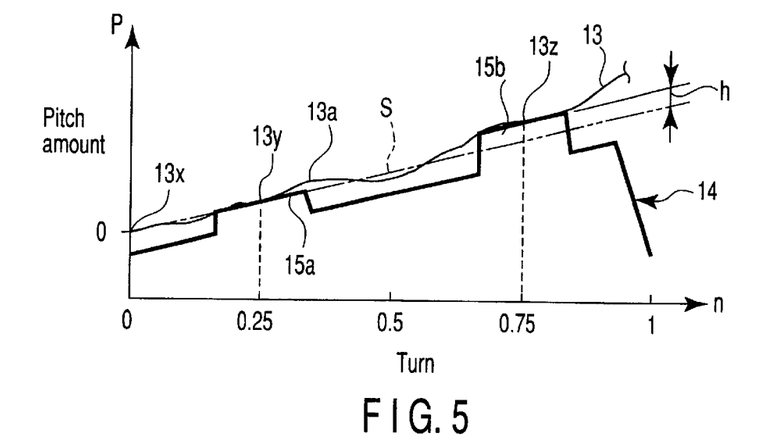
FIG. 5 illustrates how the sheet surface of the lower spring sheet and the spring end portion of the coil spring come into contact in FIG. 1, in relation to the number of turns and the pitch amount of the coil spring.

When the lower spring sheet 11 and the upper spring sheet 12 move in the direction in which the coil spring 13 is compressed, the receiving portions 15a and 15b generate reactions when they contact the spring end portion 13a. The receiving portions 15a and 15b are arranged so that the load axis γ, along which the resultant force of the reactions acts, can align with the actual application axis β. To be more specific, the receiving portions 15a and 15b are arranged in areas which are located on both sides of the central axis a of the coil spring 13 along a direction of an imaginary plane A passing both the central axis α and the actual application axis β. In this case, the coil spring 13 is set so that the wire end 13x is not supported on the receiving portion 15a or 15b. In FIG. 2, the receiving portion 15a is shown as being located in a range including position 13y that is away from the wire end 13x by 0.25 turns, and the receiving portion 15b is shown as being located in a range including position 13z that is away from the wire end 13x by 0.75 turns. As shown in FIG. 4, the receiving portions 15a and 15b are shifted from the spiral S that extends along the spring end portion 13a in the case of "N" where the load axis γ of the coil spring 13 aligns with the central axis α, along the direction of the central axis α. To be more specific, the receiving portion 15b that is closer to the actual application axis β than to the central axis α is shifted along the central axis α in the compressed direction of the coil spring 13. That is, as indicated by "h" in FIG. 5, the receiving portion 15b is raised from the spiral S along the central axis α.

With the structure described above, the center of force corresponding to the load axis γ changes from "N" to "γ". The rotating direction of the lower spring sheet 11 is used so that the load axis γ can align with the actual application axis β.

Receiving portion 15a may be lowered instead of raising receiving portion 15b. Alternatively, receiving portion 15a may be lowered, with receiving portion 15b raised. Furthermore, only receiving portion 15a may be raised, only receiving portion 15b may be lowered, and receiving portion 15a may be raised, with receiving portion 15b lowered. In each case, the load axis γ is made to align with the actual application axis β. As can be understood from this, the spring end portion 13a of the coil spring 13 is supported by inclining the sheet surface 14 of the lower spring sheet 11 in such a manner that the load axis y aligns with the actual application axis β.

The sheet surface 14 of the lower spring sheet 11 is provided with the receiving portions 15a and 15b, and the coil spring is supported on them discretely. Even if the spring end portion 13a undulates by reason of the manufacturing tolerance, the contact positions between the spring end portion 13a and the receiving portions 15a, 15b are not shifted in the spiral direction of the spring end portion 13a when the load applied to the coil spring 13 is changed.

The receiving portions 15a and 15b are arranged on both sides of the central axis α of the coil spring 13 in the imaginary plane A passing both the central axis α and the actual application axis β. In addition, the receiving portion that is closer to the actual application axis β (receiving portion 15b in the present embodiment) is shifted along the central axis α in the compressed direction of the coil spring 13. The shifted position of the receiving portion 15b, namely the height thereof, is adjusted in accordance with the specifications required, and by so doing, the load axis γ of the coil spring 13 is made to align with the actual application axis β. Even in the case where the central axis α of the coil spring 13 is inclined with reference to the actual application axis β, the load axis γ can be made to align with the actual application axis β. Therefore, the coil spring 13 can be put to use in the state that stable characteristics are maintained. Furthermore, since the coil spring 13 acts in the direction along the actual application axis β in response to an external force, the sliding portions of the damper 2 inserted through the coil spring 13 are prevented from being loaded when the lower spring sheet 11 is applied to the suspension apparatus 1, such as that shown in FIG. 15. Since the desirable characteristics of the damper 2 can be maintained, the suspension apparatus is stable in performance. In addition, since the generation of a lateral force, which would adversely affect the movement of the damper 2, can be suppressed, it is possible to solve the problems of the deflection which may be brought about by the steering moment arising from such a lateral force.

In the present embodiment, the receiving portions 15a and 15b are provided on the sheet surface 14 of the lower spring sheet 11. In place of this structure, similar receiving portions may be provided on the sheet surface of the upper spring sheet 12 to align the load axis γ of the coil spring 13 with the actual application axis β. In addition, receiving portions may be provided for both the lower spring sheet 11 and the upper spring sheet 12 to align the axis γ of the coil spring 13 with the actual application axis β.

Figure 6:
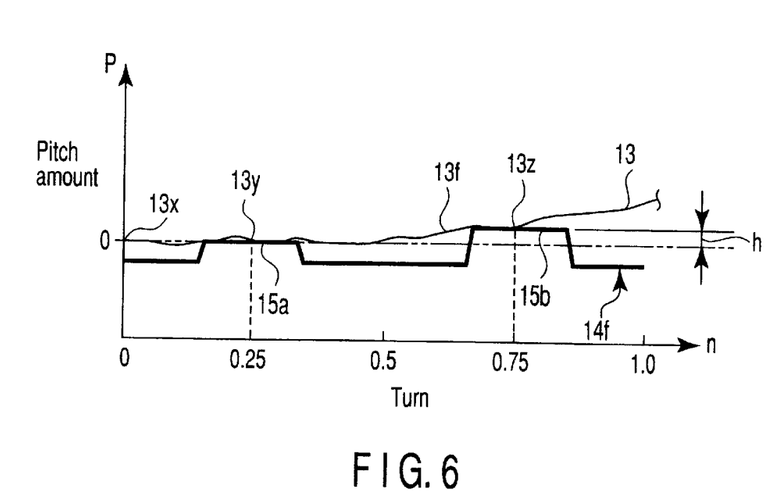
FIG. 6 illustrates how the sheet surface of the spring sheet and the spring end portion of the coil spring come into contact, if the spring end portion does not have a pitch amount at the lower spring sheet side in FIG. 1, the contact state being illustrated in relation to the number of turns and the pitch amount of the coil spring.

FIG. 6 shows how the sheet surface 14f and the spring end portion 13f come into contact in the lower spring sheet wherein the spring end portion 13f has no pitch amount. As in the case where a certain pitch amount is provided, the receiving portion 15b that is closer to the actual application axis β is shifted from the spring end portion 13f in the compressed direction of the coil spring 13. With this structure, the load axis γ of the coil spring 13 can be aligned with the actual application axis β.

The second embodiment according to the present invention will be described, referring to the lower spring sheet 21 shown in FIGS. 7 and 8. Structural elements which are similar to those of the lower spring sheet 11 of the first embodiment will be denoted by the same reference symbols as used above, and a detailed description of such structural elements will be omitted.

Figure 7:
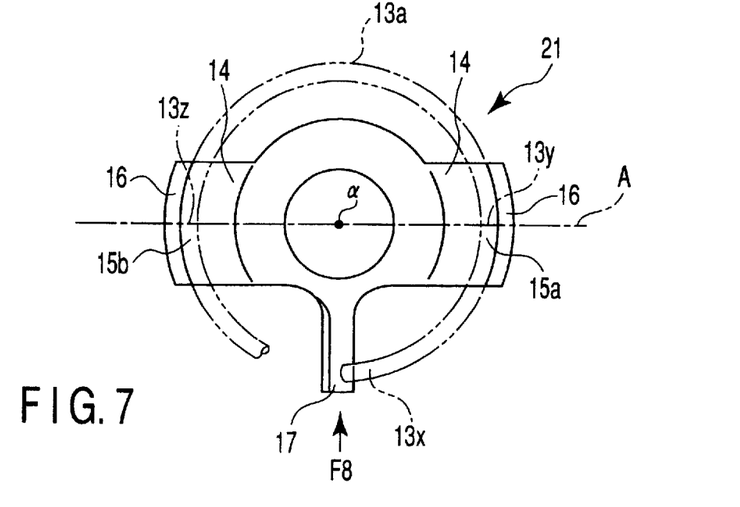
FIG. 7 is an upper surface view of a lower spring sheet according to the second embodiment of the present invention.
Figure 8:
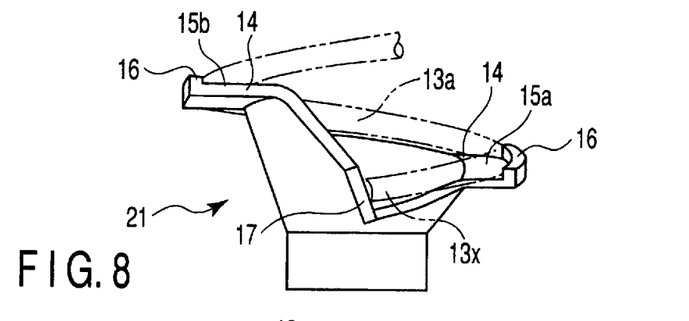
FIG. 8 is a front view showing how the lower spring sheet looks like when viewed in the direction of F8 indicated in FIG. 7.

The lower spring sheet 21 shown in FIG. 7 differs from the lower spring sheet 11 of the first embodiment in that the sheet surface 14 is cut away except for the receiving portions 15a and 15b and the stopper 17 against which the wire end 13x of the coil spring 13 hits. With this structure, the lower spring sheet 21 supports the coil spring 13 in a discrete manner. As shown in FIG. 8, the receiving portions 15a and 15b are arranged in areas which are located on both sides of the central axis α of the coil spring 13 in the imaginary plane A passing both the central axis α and the actual application axis β, and the relative position difference between the receiving portions 15a and 15b, as viewed in the direction along the central axis α, is greater than the pitch amount of the spring end portion 13a of the coil spring 13.

Accordingly, the load axis γ of the coil spring 13 can be aligned with the actual application axis β without reference to the manufacturing tolerances of the spring end portion 13a of the coil spring 13 and the lower spring sheet 21a. Furthermore, the sheet surface 14 is partially cut away.

Therefore, where the lower spring sheet 21 is fabricated by press forming, it can be easily worked with high precision since a residual stress is hardly present after working. To improve the strength of the receiving portions 15a and 15b which supports the coil spring 13, a reinforcing member, such as a rib, may be provided on those sides of the receiving portions 15a and 15b which oppose the spring coil 13. The rib, or another type of reinforcing member, may be integrally formed on one piece with the lower spring sheet 21 by press forming. Alternatively, it may be attached to the lower spring sheet 21 independently after the press forming the formation of the lower spring sheet 21.

The third embodiment according to the present invention will now be described, referring to the lower spring sheet 31 shown in FIGS. 9 and 10. Structural elements which are similar to those of the lower spring sheets 11 and 21 of the first and second embodiments will be denoted by the same reference symbols as used above, and a detailed description of such structural elements will be omitted.

Figure 9:
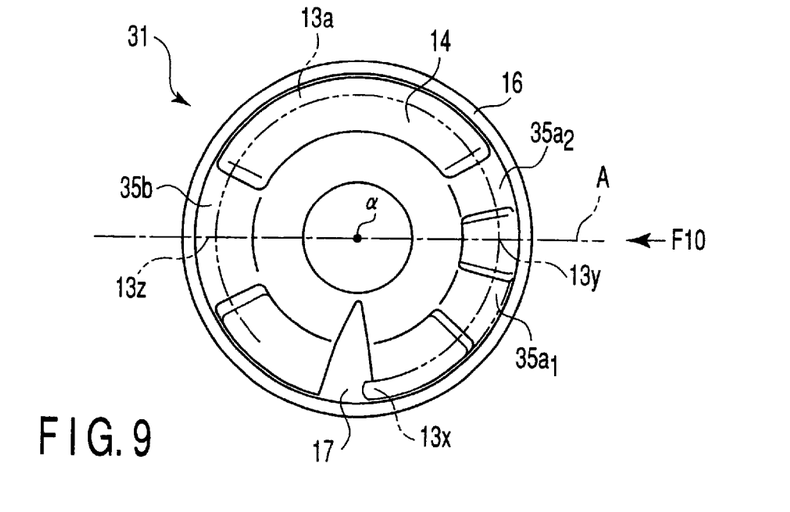
FIG. 9 is an upper surface view of a lower spring sheet according to the third embodiment of the present invention.
Figure 10:
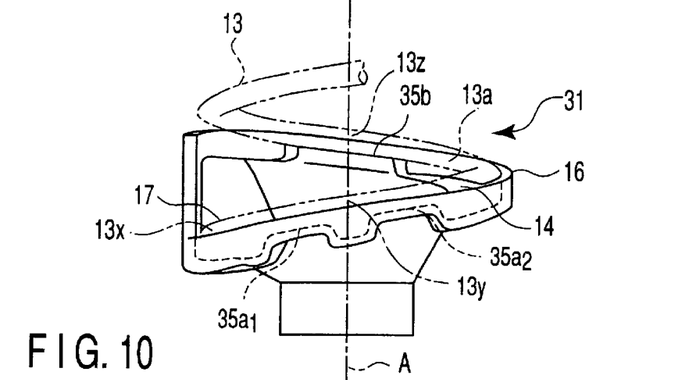
FIG. 10 is a front view showing how the lower spring sheet looks like when viewed in the direction of F10 indicated in FIG. 9.

FIG. 9 is an upper surface view of the lower spring sheet 31. FIG. 10 is a side view showing how the lower spring sheet 31 looks like when viewed in the direction of F10 indicated in FIG. 9. The lower spring sheet 31 is provided with receiving portions $35a_1$, $35a_2$ and 35b on the sheet surface 14 thereof. The receiving portions $35a_1$, $35a_2$ and 35b are arranged in area which are located on both sides of the central axis α of the coil spring 13 in the imaginary plane A passing both the central axis α and the actual application axis β. The receiving portions $35a_1$ and $35a_2$ on one side correspond to the receiving portion 15a of the lower spring sheet 11 of the first embodiment. The receiving portion 35b on the other side corresponds to the receiving portion 15b of the lower spring sheet 11 of the first embodiment. The receiving portions $35a_1$ and $35a_2$ are arranged in such a manner that the center of the forces applied to the coil spring 13 from receiving portions $35a_1$, $35a_2$ aligns along the imaginary plane A when the lower spring sheet 31 is exerted with an external force and the coil spring 13 is compressed. In addition, the receiving portion 35b is shifted from the receiving portions $35a_1$ and $35a_2$ along the central axis α in the compressed direction of the coil spring 13. Depending upon the position of the load axis γ of the coil spring 13, the positions of the receiving portions may be arbitrarily determined to align the load axis γ with the actual application axis β. For example, in FIG. 9, receiving portion 35b may be shifted counterclockwise or receiving portion $35a_2$ may be shifted clockwise.

The lower spring sheet 31 provided with the receiving portions $35a_1$, $35a_2$ and 35b arranged as above causes the load axis γ of the coil spring 13 to align with the actual application axis β. Since the receiving portions $35a_1$ and $35a_2$ on one side are arranged so the center of the forces applied to the coil spring 13 aligns along the imaginary plane A, the load axis γ is prevented from leaving from the actual application axis β in a direction out of the imaginary plane A. In other words, the lower spring sheet 31 can easily maintain the state where the load axis γ of the coil spring 13 is in alignment with the actual application axis β.

Figure 11:
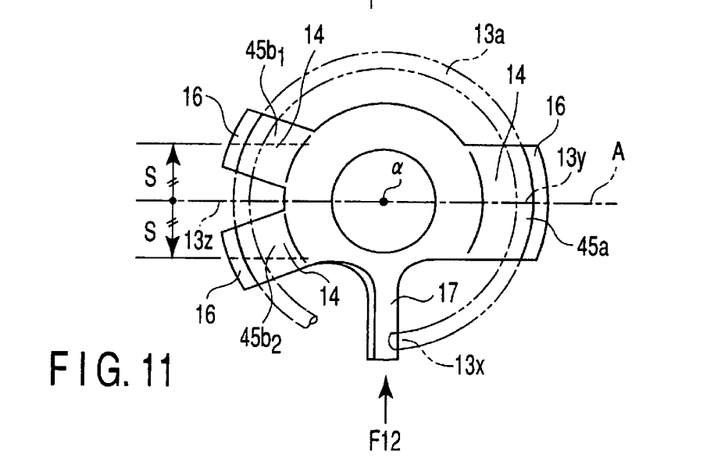
FIG. 11 is an upper surface view of a lower spring sheet according to the fourth embodiment of the present invention.
Figure 12:
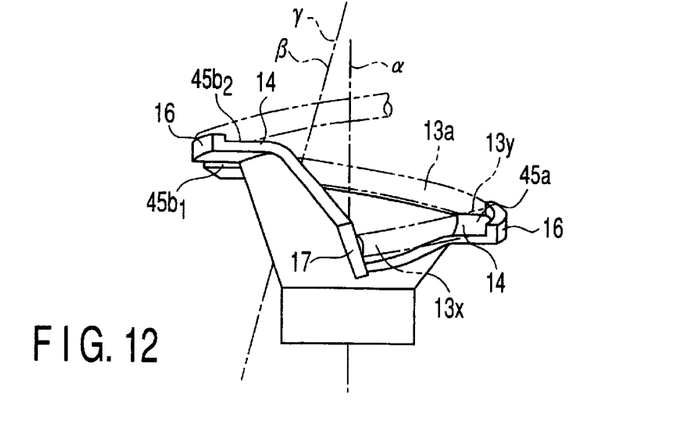
FIG. 12 is a front view showing how the lower spring sheet looks like when viewed in the direction of F12 indicated in FIG. 11.
Figure 13:
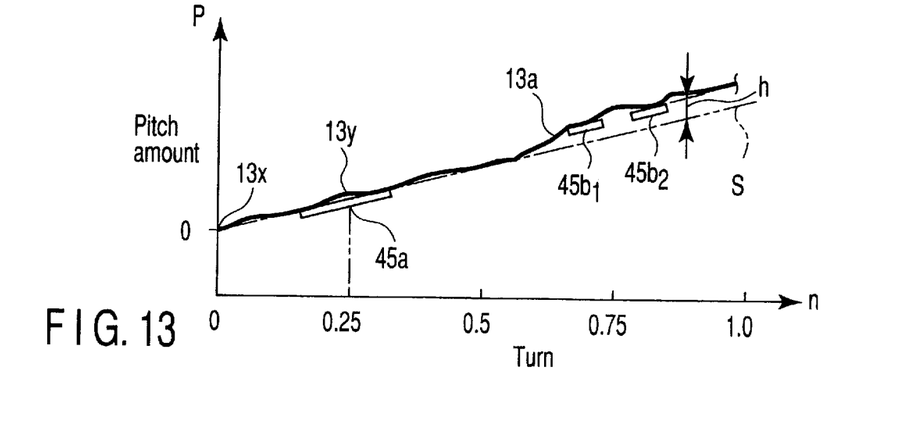
FIG. 13 illustrates how the sheet surface of the spring sheet and the spring end portion of the coil spring come into contact in FIG. 11, in relation to the number of turns and the pitch amount of the coil spring.

The fourth embodiment according to the present invention will be described, referring to the lower spring sheet 41 shown in FIGS. 11 to 13. Structural elements which are similar to those of the lower spring sheets 11, 21 and 31 of the first, second and third embodiments will be denoted by the same reference symbols as used above, and a detailed description of such structural elements will be omitted. FIG. 11 is an upper surface view of the lower spring sheet 41. FIG. 12 is a front view showing how the lower spring sheet 41 looks like when viewed in the direction of F12 indicated in FIG. 11. FIG. 13 illustrates how the sheet surface 14 of the lower spring sheet 41 and the spring end portion 13a of the coil spring 13 come into contact.

The lower spring sheet 41 is provided with receiving portions 45a, $45b_1$ and $45b_2$. As in the lower spring sheet 21 of the second embodiment, the sheet surface 14 is cut away except for the receiving portions 45a, $45b_1$ and $45b_2$ and the stopper 17. The receiving portion 45a and the receiving portions $45b_1$ and $45b_2$ are arranged in areas which are located on both sides of the central axis α of the coil spring 13 along the direction of the imaginary plane A passing both the central axis α and the actual application axis β. The receiving portion 45a on one side corresponds to the receiving portion 15a of the lower spring sheet 21 of the second embodiment. The receiving portions $45b_1$ and $45b_2$ on the other side correspond to the receiving portion 15b of the lower spring sheet 21 of the second embodiment. The receiving portions $45b_1$ and $45b_2$ are away from the imaginary plane A by the same distance "s" so that the center of the forces applied from the receiving portions $45b_1$, $45b_2$ to the coil spring 13 aligns along the imaginary plane A when the lower spring sheet 41 is exerted with an external force and the coil spring 13 is compressed. The receiving portions $45b_1$ and $45b_2$ are shifted from the receiving portion 45a along the central axis α in the compressed direction of the coil spring 13, as indicated by "h" in FIG. 13. Depending upon the position of the load axis γ of the coil spring 13, the positions of the receiving portions may be arbitrarily determined to align the load axis γ with the actual application axis β. For example, in FIG. 11, receiving portion 45a may be shifted clockwise, or receiving portion $45b_1$ may be shifted counterclockwise.

In the manner described above, when the lower spring sheet 41 having the receiving portions 45a, $45b_1$ and $45b_2$ makes the load axis γ of the coil spring 41 align with the actual application axis β, as shown in FIG. 12. In addition, the load axis γ is prevented from leaving from the actual application axis β in a direction out of the imaginary plane A. In other words, the lower spring sheet 41 can easily maintain the state where the load axis γ of the coil spring 13 is in alignment with the actual application axis β.

The fifth embodiment according to the present invention will be described, referring to the lower spring sheet 51 shown in FIG. 14. Structural elements which are similar to those of the lower spring sheets 11, 21, 31 and 41 of the first, second, third and fourth embodiments will be denoted by the same reference symbols as used above, and a detailed description of such structural elements will be omitted.

Figure 14:
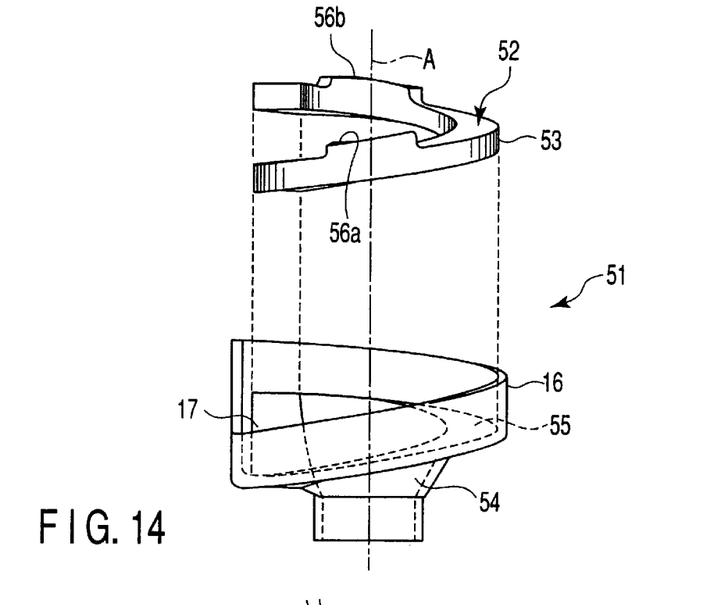
FIG. 14 is an exploded view showing a lower spring sheet according to the fifth embodiment of the present invention, the lower spring sheet being showing as being made up of a spring receiving member and a bracket.

The lower spring sheet 51 shown in FIG. 14 is provided with a spring receiving member 53 on which a sheet surface 52 is formed, and a bracket 54 that supports the spring receiving member 53. In other words, the lower spring sheet 11 is separated and is made up of the spring receiving member 53 and the bracket 54.

The spring receiving member 53 is formed to be spiral and extends along the coupling portion 55 of the bracket 54. In the case where the coupling portion 55 is perpendicular to the central axis α, the spring receiving member 53 and the bracket 54 are fixed to each other so that they do not rotate around the central axis α. For example, the spring receiving member 53 and the bracket 54 are coupled together by means of engagement portions, a combination of a key with a key groove, a lock pin, and a combination of a convex portion provided for one of the two and a concave portion provided for the other. The spring receiving member 53 is formed of an elastic member, preferably rubber. The rubber may be replaced with a reinforced plastic material, elastomer, or the like.

The sheet surface 52 is provided with receiving portions 56a and 56b, which come into contact with the spring end portion 13a of the coil spring 13 in a discrete way. To be more specific, the receiving portions 56a and 56b are arranged in areas which are located on both sides of the central axis α of the coil spring 13 along the direction of the imaginary plane A passing both the central axis α and the actual application axis β. In addition, the receiving portion 56b that is closer to the actual application axis β than to the central axis α is shifted from the other receiving portion 56a along the central axis α in the compressed direction of the coil spring 13. The receiving portions may be arranged in the same way as in the lower spring sheets 31 and 41 of the third and fourth embodiments.

As described above, the lower spring sheet 51 is separated and made up of the spring receiving member 53 and the bracket 54. With this structure, the shape of each member can be as simple as possible. Moreover, each member has a small number of portions requiring high precision. As a result, both the spring receiving member 53 and the bracket 54 can be manufactured at low cost. It should be noted that the manufacturing tolerance of the coil spring 13 and that of the spring receiving member 53 can cancel each other by properly varying the combination of them. Moreover, the lower spring sheet 51 can be applied to suspension apparatuses of different specifications by preparing spring receiving members 53 of different specifications and selectively using them for the bracket 54 of one type.

The first to fifth embodiments were described, referring to the lower spring sheet as an example of a spring sheet. Needless to say, the present invention is applicable to an upper spring sheet as well. The number of receiving portions, the rotational position determined with the central axis as a center and the direction in which the center axis extends, are not limited to those described in relation to the above embodiments or those illustrated in the drawings. They can be arbitrarily determined to align the load axis of the coil spring with the actual application axis.

The first to fifth embodiments were described, referring to the case where the actual application axis intersects with the central axis of the coil spring. Even in the case where the actual application axis does not intersect with the central axis, such as three-dimensional out-of-contact crossing condition, the number and arrangement of the receiving portions can be determined to align the load axis of the coil spring with the actual application axis. That is, when the coil spring is exerted with a load, the load axis does not deviate from the position intended at the time of design without reference to the manufacturing tolerance, and can be made to align with the actual application axis. In other words, the direction of the load axis of the coil spring can be controlled by intentionally arranging a plurality of receiving portions for the spring sheet.

The present invention is not limited to the foregoing embodiments, and the embodiments can be modified in various ways without departing from the spirit and scope of the present invention. For example, although one of the two receiving portions is divided in the embodiments described above, both receiving portions may be divided. The foregoing embodiments were described, referring to the case where the spring sheet is applied to strut type suspension apparatus that is assembled in a vehicle. The spring sheet is not limited to this and is applicable to another type of suspension apparatus. Further, the spring sheet is also applicable to another type of apparatus, another device or another element, such as the valve spring used in a supply and exhaust valve. In short, the spring sheet is able to use with a coil spring whose actual application axis (along which a load acts in actuality) is inclined with reference to the central axis of the coil spring.

The spring sheet according to the present invention is designed so that its sheet surface can come into contract with specific portions of the spring end portion. Even if the undulated portions arising from the manufacturing tolerance of the spring end portion extends when the coil spring is compressed, the load axis can be controlled so that the contact positions between the sheet surface and the spring end portion and the distribution of contact reactions can remain unchanged. In addition, the contact positions between the sheet surface and the spring end portion remain at their desired positions without reference to the pitch tolerance of the coil spring and the tolerance of the sheet surface.

The receiving portions are arranged in areas which are located on both sides of the central axis of the coil spring along the direction of the imaginary plane passing both the central axis and the actual application axis. On each side, the receiving portion is arranged in such a manner that the center of the forces applied from the receiving portion to the coil spring is in the imaginary plane. With this structure, not only the advantage described above is attained but also the load axis of a force applied to the coil spring can remain in the imaginary plane.

The receiving portion that is closer to the actual application axis is arranged to be shifted from the other receiving portion that is farther from the actual application axis, along the central axis in the compressed direction of the coil spring. With this structure, the load axis is made to align with the actual application axis which is applied an external force actually. Even in the case where the central axis of the coil spring is assembled to be shifted from the actual application axis, the load axis aligns with the actual application axis. Hence, a lateral force, which would adversely affect movement along the actual application axis, is not generated.

The spring sheet can be separated is divided and made up of a spring receiving member formed on the sheet surface and a bracket that supports the spring receiving member. With this structure, the load axis can be easily aligned with the actual application axis by selectively employing one of spring receiving members wherein receiving portions are formed on the sheet surface in different rotational arrangements, or at different positions in the direction of the central axis.

The spring sheet according to the present invention is adapted for a coil spring that is used in a state where an actual application axis along which a load is exerted on the coil spring is differed from the central axis of the coil spring.

What is claimed is:

1. A spring sheet for supporting a coil spring, comprising a sheet surface which receives a spring end portion of said coil spring, said sheet surface being provided with a plurality of receiving portions, and said plurality of recieving portion discretely contacting with the spring end portion of the coil spring in a direction along a wire of the coil spring, the sheet surface recieving the spring end portion of the coil spring in such a condition that the central of the coil spring being shifted from an actual application axis along which a load being applied, the plurality of recieving portions being arranged at position sandwiching the central axis from both sides with respect to a direction in which the coil spring is shifted, and said position of the plurality of receiving portion aligning in the direction along the central axis being arranged at other position where a load axis, which is obtained by a distribution of a contact reaction when the coil spring comes into contact with the receiving portions is aligning with the actual application axis.

2. The spring sheet according to claim 1, wherein said plurality of receiving portions is arranged at least on one side of the sheet surface.

3. The spring sheet according to claim 1, which includes a spring receiving member on which the sheet surface is formed, and a bracket which supports the spring receiving member.

4. A spring sheet for supporting a coil spring, comprising a plurality of receiving portions arranged in a winding direction of said coil spring, the receiving portions supporting a spring end portion of the coil spring, the receiving portion being arranged such that a load axis along which a spring, aligns with an actual application axis which indicates a direction in which a load is exerted on the coil spring.

5. A spring sheet according to claim 4, the receiving portions being located on both sides of a central axis of the coil spring along an imaginary plane passing the actual application axis and the central axis, and a center of forces which at least one receiving portion on each side across the central axis applies to the coil spring being in the imaginary plane.

6. The spring sheet according to claim 5, wherein at least one receiving portion located close to the actual application axis being shifted from at least one receiving portion located far away from the actual application axis, along the central axis in a compressed direction of the coil spring.

7. A spring sheet for supporting a coil spring, comprising:
   a sheet surface receiving a spring end portion of said coil spring, and
   a plurality of receiving portions discretely contacting with the spring end portion of the coil spring in a direction along said wire of the coil spring,
   wherein the sheet surface receiving the spring end portion of the coil spring in such a condition that a central axis of the coil spring being shifted from an actual application axis along which a load being applied, the plurality of receiving portions being arranged at positions sandwiching the central axis from both sides with respect to a direction in which the coil spring is shifted, and said positions of the plurality of receiving portions being arranged such that a load axis along which a resultant of forces the receiving portions apply to the coil spring, aligns with an actual application axis which indicates a direction in which a load is exerted on the coil spring.

8. The spring sheet according to claim 7 wherein said plurality of receiving portions being arranged at least on one side of the sheet surface.

9. The spring sheet according to claim 7, which includes a spring receiving member on which the sheets surface is formed, and a bracket which supports the spring receiving member.

10. The spring sheet according to claim 7, wherein the receiving portions being located on both sides of a central axis of the coil spring along an imaginary plane passing the actual application axis and the central axis.

11. The spring sheet according to claim 7, wherein a center of forces which at least one receiving portion on each side across the central axis applies to the coil spring being in the imaginary plane.

12. The spring sheet according to claim 7, wherein at least one receiving portion located close to the actual application axis being shifted from at least one receiving portion located far away from the actual application axis, along the central axis in a compressed direction of the coil spring.

* * * * *